US009432198B2

(12) United States Patent
Falk et al.

(10) Patent No.: US 9,432,198 B2
(45) Date of Patent: Aug. 30, 2016

(54) METHOD FOR CERTIFICATE-BASED AUTHENTICATION

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/820,811

(22) PCT Filed: Jul. 22, 2011

(86) PCT No.: PCT/EP2011/062644
§ 371 (c)(1),
(2), (4) Date: Mar. 5, 2013

(87) PCT Pub. No.: WO2012/031821
PCT Pub. Date: Mar. 15, 2012

(65) Prior Publication Data
US 2013/0173914 A1  Jul. 4, 2013

(30) Foreign Application Priority Data
Sep. 7, 2010 (DE) .......................... 10 2010 044 517

(51) Int. Cl.
*H04L 29/06* (2006.01)
*H04L 9/32* (2006.01)

(52) U.S. Cl.
CPC .......... *H04L 9/3268* (2013.01); *H04L 63/0823* (2013.01)

(58) Field of Classification Search
CPC ......... H04L 9/00; H04L 63/00; H04L 9/3268; H04L 63/0823; H04L 9/32; H04W 12/00; G06F 21/00
See application file for complete search history.

(56) References Cited

U.S. PATENT DOCUMENTS 5,995,625 A * 11/1999 Sudia et al. .................... 705/51
6,058,484 A *  5/2000 Chapman et al. ............ 726/10
(Continued)

FOREIGN PATENT DOCUMENTS

WO  2012/031821 A1  3/2012  ............ H04L 29/06

OTHER PUBLICATIONS

Anonymous, "Gesetz über Rahmenbedingugnen für elektonische Signaturen (Signaturgesetz-SigG)," Austfertigungsdatum, 15 pages (German with English abstract), May 16, 2001.
(Continued)

*Primary Examiner* — Chau Le
*Assistant Examiner* — Muhammad Chaudhry
(74) *Attorney, Agent, or Firm* — Slayden Grubert Beard PLLC

(57) ABSTRACT

A method is disclosed for certificate-based authentication, in which a first subscriber authenticates himself to a second subscriber using a digital certificate associated to the first subscriber. The certificate specifies requirement(s) and the fulfillment of a requirement is ensured by a third subscriber. Within the framework of the authentication by the second subscriber, a validity condition is checked, and the certificate is classified as valid if the validity condition is fulfilled, based on the issue and/or absence of issue of the requirement(s) specified in the certificate by the third subscriber. Requirements may be used to restrict the validity of the certificate. The validity of a certificate can thereby be controlled in a simple and flexible manner without explicitly defining the validity in the certificate. The method can be used for authentication in any technical field, e.g., to authentication subscribers in the form of components of an automation system.

11 Claims, 1 Drawing Sheet

(56) References Cited

U.S. PATENT DOCUMENTS

| | | | |
|---|---|---|---|
| 7,581,011 B2* | 8/2009 | Teng | 709/229 |
| 2007/0204078 A1* | 8/2007 | Boccon-Gibod et al. | 710/54 |
| 2009/0144540 A1* | 6/2009 | Davis et al. | 713/156 |
| 2009/0288155 A1 | 11/2009 | Joshi et al. | 726/9 |
| 2011/0131643 A1* | 6/2011 | Lawrence et al. | 726/10 |
| 2011/0167257 A1* | 7/2011 | Gossel | 713/156 |
| 2013/0173914 A1 | 7/2013 | Falk et al. | 713/156 |

OTHER PUBLICATIONS

Cantor, Scott et al., "An X.509 Binding for SAML," Atlassian Confluence 3.3.3. *the Enterprise Wild*, internet webpage: https://spaces.internet2.deu/display/GS/X509BindingSAML, 2 pages, Jan. 17, 2007.

Bustamante, Michele Leroux, "A Better Approach for Building Claims-Based WCF Services," Microsoft Geneva Frameworks, internet webpage: http://msdn.microsoft.com/en-us/magazine/dd278426.aspx, 11 pages, Dec. 2008.

Farrell, S. et al., "An Internet Attribute Certificate Profile for Authorization," Internet Engineering Task Force, Internet Society, 50 pages, Jan. 5, 2010.

Anonymous, "SAML V2.0 Holder-of-Key Web Browser SSO Profile Version 1.0," Oasis, Committee Specification 02, internet webpage: http://docs.oasis-open.org/security/saml/Post2.0/sstc-saml-holder-of-key-browser-sso.pdf, 24 pages, Aug. 10, 2010.

German Office Action, Application No. 10 2010 044 517.7, 7 pages, Jul. 6, 2011.

International Search Report and Written Opinion, Application No. PCT/EP2011/062644, 17 pages, Jan. 25, 2012.

Turner, Sean et al., "RFC 5755—An Internet Attribute Certificate Profile for Authorization," Internet Engineering Task Force, 42 pages, Jan. 31, 2010.

Chinese Office Action, Application No. 201180043126.1, 11 pages, Dec. 19, 2014.

Chinese Office Action, Application No. 201180043126.1, 11 pages, Aug. 28, 2015.

Brown, Keith, "Security Briefs: Exploring Claims-Based Identity," Microsoft Corporation and CMPO Media, LLC; MSDN Magazine, XP55254754, http://download.microsoft.com/download/3/A/7/3A7FA450-1 F33-41 F7-9E6D-3AA95B5A6AEA/MSDNMagazineSeptember2007en-us.chm, 8 pages, 2007.

Anonymous, "SAML in X.509 Validation," Globus, XP55254760, URL:https://web.archive.org/web/20090311071029/http://dev.globus.org/wiki/SAML_in_X.509_Validation, 6 pages, Retrieved on Feb. 3, 2016.

\* cited by examiner

METHOD FOR CERTIFICATE-BASED AUTHENTICATION

CROSS-REFERENCE TO RELATED APPLICATIONS

This application is a U.S. National Stage Application of International Application No. PCT/EP2011/062644 filed Jul. 22, 2011, which designates the United States of America, and claims priority to DE Patent Application No. 10 2010 044 517.7 filed Sep. 7, 2010 The contents of which are hereby incorporated by reference in their entirety.

TECHNICAL FIELD

The disclosure relates to a method for certificate-based authentication in which a first subscriber authenticates himself to a second subscriber using a digital certificate associated to the first subscriber.

BACKGROUND

Digital certificates are known in the art. They contain the identity of an entity in the form of a person or institution or machine, for which the certificate has been issued. The term subscriber is used here and below, to which a certificate can be associated. A subscriber can in this context be a computer or a machine for which the certificate is issued. Likewise, a "subscriber" can relate to a computer or machine which administers the certificate of a person or institution. Due to the responsibility for the administration of the certificate, the certificate is associated to the computer or the machine.

A certificate contains a public key for the corresponding entity, and the owner of the certificate can be confirmed by way of a digital signature in the certificate. The digital signature is in this case calculated by a certificate issuing unit. By means of a root-certificate from this issuing unit or by a certificate chain leading to the root-certificate, the signature can be verified as valid. Additional information can be encoded in a digital certificate in the form of what are referred to as attributes, by means of which entitlements for the user of the certificate or utilization restrictions on the certificate can be specified.

Certificates as a rule exhibit a limited period of validity, which is specified as information in the certificate. After the end of the period of validity, the certificate automatically becomes invalid. It must therefore be ensured, within the framework of the administration of certificates, that a certificate which is intended to be available beyond its period of validity will be promptly replaced by a corresponding certificate with a new period of validity. In practice, this is associated with a high level of administrative effort. In particular with the issue of certificates for automation devices, which will be used over a long period of time and are not subject to a stringent computer administration, this can only be put into effect with difficulty. There is indeed the possibility of issuing certificates with very long or unlimited periods of validity, but this increases the risk of misuse.

The general principle of revoking certificates is also known in the art. The revocation of certificates is, however, an elaborate matter, because certificate revocation lists must be issued and distributed. Moreover, a certificate which has once been revoked is permanently invalid and cannot be reactivated again.

For the authentication of a subscriber in relation to another subscriber or to a service (e.g. Web service), the use is known of what are referred to as SAML assertions (SAML=Security Assertion Mark-up Language). These assertions represent statements which are assured by an issuer of the assertions. The authentication of the subscriber in respect of another subscriber or a service can therefore be linked to the issue of corresponding SAML assertions. Only if predetermined assertions are assured for a subscriber will his authentication take place.

Also known in the art is what is referred to as the "claims-based authorization model", which was developed by the company Microsoft®. In this situation, a user is not represented by a fixed identity, but by a quantity of what are referred to as claims, which confirm the properties of the user. A possible claim is, for example, an authentication by means of a certificate, a password, and the like. Depending on the claims present, access is either granted or rejected.

The publication S. Farrell, Trinity College Dublin, R. Housley, Vigil Security, S. Turner, IECA: "An Internet Attribute Certificate Profile for Authorization, rfc5755.txt", Internet Engineering Task Force, IETF; Standard, Internet Society (ISOC) 4, Rue des Falaises CH-1205 Genf, Switzerland, Jan. 25, 2010, pages 1 to 50, describes the use of attribute certificates which contain a set of attributes which can be used to authorize a subscriber.

In the anonymous document: "SAML V2.0 Holder-of-Key Web Browser SSO Profile Version 1.0", Aug. 10, 2010, pages 1 to 24, the authentication of a subscriber is described using SAML assertions.

The publication Cantor, Scott et al.: "An X.509 Binding for SAML", Jan. 17, 2007, pages 1 and 2, discloses the embedding of SAML assertions in X.509 certificates.

SUMMARY

One embodiment provides a method for certificate-based authentication, in which a first subscriber authenticates himself to a second subscriber using a digital certificate associated to the first subscriber and which contains a public key of the first subscriber, wherein the certificate specifies one or more requirements and the fulfillment of a requirement is ensured by a third subscriber, in that the third subscriber issues the requirement; within the framework of the authentication by the second subscriber, a validity condition is checked, and the certificate of the first subscriber is classified by the second subscriber as valid if the validity condition is fulfilled, wherein the validity condition is dependent on the issue and/or absence of issue of one or more of the requirements specified in the certificate by the third subscriber.

In a further embodiment, the first subscriber requests the information from the third subscriber as to whether one or more of the requirements specified in the certificate were issued by the third subscriber, wherein the first subscriber provides the information requested to the second subscriber, whereupon the second subscriber, based on this information, checks the validity condition.

In a further embodiment, the second subscriber requests the information from the third subscriber as to whether one or more of the requirements specified in the certificate have been issued by the third subscriber, wherein the second subscriber, based on the requested information, checks the validity condition.

In a further embodiment, the first and/or second subscriber must authenticate themselves to the third subscriber for the requesting of the requirement(s).

In a further embodiment, in the certificate one or more of the following requirements are specified: a requirement with regard to the time validity of the certificate; a requirement with regard to a communications environment in which the first subscriber is being operated; a requirement with regard to one or more properties of the first and/or second and/or third subscriber; a requirement with regard to the trustworthiness of the authentication of the first subscriber to the second subscriber.

In a further embodiment, the validity condition is a logic operations sequence comprising several AND- and/or NAND- and/or OR- and/or XOR- and/or NOR-links, wherein the operations sequence may be encoded in the certificate.

In a further embodiment, the requirements are based on SAML.

In a further embodiment, within the framework of the authentication of the first subscriber in respect of the second subscriber a verification is performed of the certificate of the first subscriber by the second subscriber.

In a further embodiment, with a public key of the first subscriber contained in the certificate as well as a private key allocated to this public key, a cryptographically secure connection is set up between the first and second subscribers.

In a further embodiment, the authentication is based on the SSL/TLS protocol and/or the IKE/IPsec protocol and/or the IKEv2/IPsec protocol.

In a further embodiment, the certificate is an extended X.509 certificate, which additionally specifies one or more requirements.

In a further embodiment, the method for the authentication of the first subscriber to the second subscriber and of the second subscriber to the first subscriber is used.

In a further embodiment, the first and/or the second and/or the third subscriber represent components of an automation system.

Another embodiment provides a communications network with a first, second, and third subscriber, wherein, in the operation of the communications network, a certificate-based authentication can be performed, in which the first subscriber authenticates himself to the second subscriber with the aid of a digital certificate associated to the first subscriber and containing a public key of the first subscriber, wherein the certificate specifies one or more requirements and the fulfillment of a requirement is ensured by a third subscriber, in that the third subscriber issues the requirement; within the framework of the authentication by the second subscriber, a validation condition is checked, and the certificate of the first subscriber is classified as valid by the second subscriber if the validity condition is fulfilled, wherein the validity condition is dependent on the issue and/or absence of issue of one or more of the requirements specified in the certificate by the third subscriber.

In a further embodiment, the communications network is designed in such a way that a method as disclosed above can be implemented in the communications network.

BRIEF DESCRIPTION OF THE DRAWINGS

Exemplary embodiments will be explained in more detail below based on the schematic drawings, wherein.

DETAILED DESCRIPTION

Figure 1:
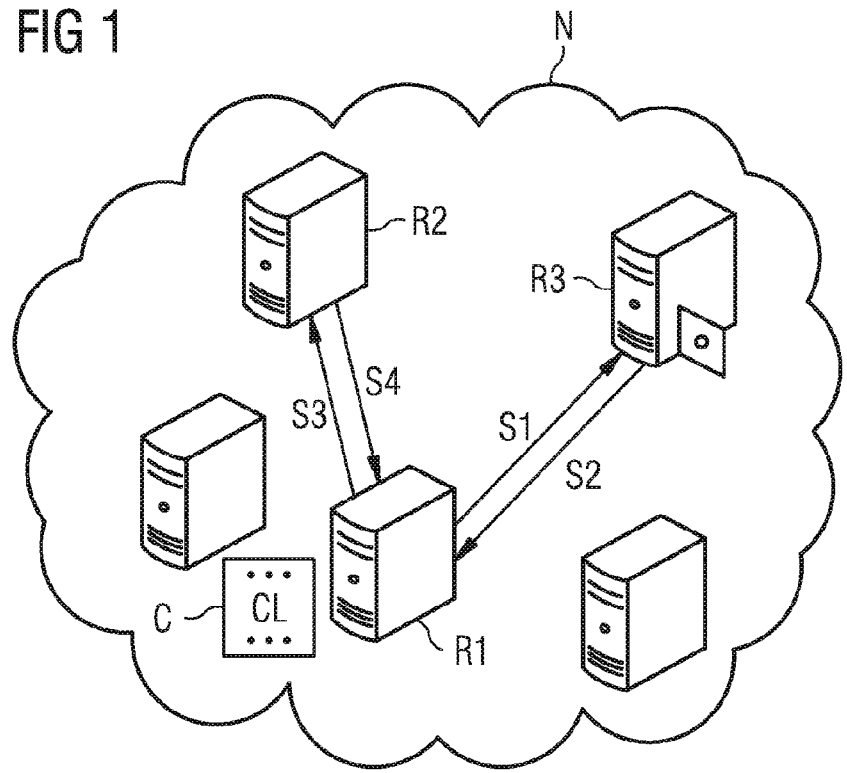
FIG. 1 shows a diagrammatic representation of a communications network, in which an embodiment form of the certificate-based authentication is performed.

Embodiments of the present disclosure provide a certificate-based authentication with which the validity of the certificate used for this can be controlled easily and flexibly.

In some embodiments, an authentication is performed in which a first subscriber authenticates himself to a second subscriber using a digital certificate associated to the first subscriber and which contains a public key of the first subscriber. In this situation, the certificate specifies one or more requirements, wherein the fulfillment of a requirement is ensured by a third subscriber, who issues the requirement. The term "specification" of requirements in the certificate is to be understood in the broad sense in this context. The specified requirements can be deposited directly in the certificate or be specified by means of an identifier or name. Likewise, the specification of one or more requirements can be performed by means of a reference, which refers to the requirements, such as a URI or a URL. The term "issue" of a requirement is also to be understood broadly in the context of this disclosure. A requirement may then be regarded as issued, for example, if it is deposited at the corresponding third subscriber, or can be called up by this subscriber.

Within the framework of the authentication, a validity condition is verified by the second subscriber, and the certificate of the first subscriber is then classified by the second subscriber as valid when the validity condition is fulfilled. The validity condition depends on the issue and/or non-issue by the third subscriber of one or more of the requirements specified in the certificate. If the correspondingly specified validity condition is not fulfilled in this situation, the certificate will be regarded as invalid, and a corresponding authentication will be interrupted. In this situation, in particular, as a validity condition, the second subscriber can check whether, at the time of the checking of the certificate of the first subscriber, the specified requirements are fulfilled by the issue of the requirements by the third subscriber.

In some embodiments of the method the validity of a certificate is no longer determined directly in the certificate itself, but indirectly by means of the use of corresponding requirements, which are administered easily and flexibly by a third subscriber, who issues the corresponding requirements. In one embodiment, recourse can be made to a syntax known per se for the definition of corresponding requirements, and, in particular the requirements can represent the SAML assertions referred to heretofore or corresponding claims from the "claims-based authorization model".

In one embodiment of the method, the first subscriber requests the third subscriber for the information as to whether one or more of the requirements specified in the certificate have been issued by the third subscriber. The first subscriber in this situation provides the information requested to the second subscriber, for example by passing the issued requirements to the second subscriber. Thereupon the second subscriber, based on this information, checks the validity condition. As an alternative or in addition, it is also possible for the second subscriber to request the information directly from the third subscriber as to whether one or more of the requirements specified in the certificate have been issued by the third subscriber, in order then, based on the requested information, to check the validity condition.

In order to avoid misuse by an unauthorized request for requirements to the third subscriber, in one embodiment the first and/or second subscriber authenticate with the third subscriber with regard to the request for the requirement(s). Only if authentication is successful does the corresponding subscriber then receive the information about the requirements.

Depending on the application situation, any desired types of requirements can be specified in the certificate. In particular, a requirement can be specified with regard to the time validity of the certificate, i.e. the time validity of the certificate is linked to the issue of a corresponding requirement, without taking account of further criteria. Furthermore, a requirement can relate to the communications environment in which the first subscriber is operating. This communications environment can be determined, for example, by special properties or a corresponding address of the communications network. Likewise, a requirement may relate to one or more properties of the first and/or second and/or third subscriber. For example it can be determined that only specific first or second or third subscribers may be used within the framework of the certificate-based authentication. In particular, in this situation it can also be determined from which subscriber the certificates being issued must derive. Moreover, a requirement may specify the trustworthiness of the authentication of the first subscriber at the second subscriber. Only if the trustworthiness specified in the requirement is met, for example in the form of a confidence value, will the certificate be regarded as valid. By this means account can be taken of the fact that the trustworthiness of an authentication may change with time, due, for example, to an attack on a specific subscriber having become known.

In a further embodiment of the method, the validity condition is a logic operations sequence, comprising one or more AND- and/or NAND- and/or OR- and/or XOR- and/or NOR gating operations, wherein the logic operations sequence may be coded in the certificate. In this way, for example, block requirements can be processed very well, wherein, if a block requirement is present, the certificate is regarded as invalid. By means of a NAND-operation, therefore, the validity of the certificate can be linked to the absence of a block requirement.

In a further embodiment of the method, within the framework of the authentication of the first subscriber in respect of the second subscriber, in addition to the check referred to heretofore on the validity condition of the certificate, a verification of the certificate can also take place. This verification can take place in a manner known per se by checking the signature of the certificate.

In a further embodiment of the method, with a public key of the first subscriber contained in the certificate, and the private key allocated to this public key, a cryptographically secured connection can be set up between the first and second subscribers. If appropriate, within the framework of this cryptographically secured connection a transfer can also take place of the corresponding requirements for the checking of the validity condition. Should it transpire in this situation that the validity condition is not fulfilled, the encrypted connection, and therefore the authentication, will be interrupted. In a variant, when the encrypted connection has been set up, a renewed check of the validity condition is repeatedly performed, e.g. periodically every 5 minutes or hourly. If this is not the case, in one alternative embodiment the connection will be terminated.

The authentication performed with the disclosed method may be based on protocols known per se, e.g. the SSL/TLS protocol and/or the IKE/IPsec protocol and/or the IKEv2/IPsec protocol, wherein, additionally, the check of the validity condition takes place on the basis of corresponding requirements. Likewise, the certificate used within the framework of the present disclosure may be based on a certificate known per se. In particular, the certificate may represent an extended X.509 certificate, which, in addition to the entries known per se, specifies one or more requirements.

The method may, if appropriate, also be used for mutual authentication between the first and second subscribers. That is to say, with the method the first subscriber authenticates himself to the second subscriber, and, reversing the roles of first and second subscriber, the second subscriber analogously authenticates himself to the first subscriber.

The method may be used for any desired first or second or third subscribers in the form of computers or machines. In this situation, the subscribers may represent components of an automation system, such as, for example, appropriate control devices, sensors, actuators, and the like.

Other embodiments provide a communications network with a first, second, and third subscriber, wherein, during operation of the communications network, a certificate-based authentication can be performed in accordance with the method described heretofore, or in accordance with one or more variants of the method described heretofore.

FIG. 1 shows in diagrammatic representation a communications network N with a plurality of computers, wherein the computers participating in the certificate-based authentication described hereinafter are designated by R1, R2, and R3. The computer R1 corresponds in this situation to a first subscriber in the meaning of claim 1, the computer R2 to a second subscriber, and the computer R3 to a third subscriber. The subscribers do not necessarily have to be computers, but may also represent any other desired communicating units, such as, for example, automation units or machines. In particular, the automation units may be corresponding components of an automation system, which is carrying out an automatic manufacturing or production process. The individual automation units may represent, for example, a programmable control device, a sensor, an electric automobile, a current charging column for an electric automobile, an electricity meter, an energy automation device, a computer tomograph, an X-ray device, and the like. All automation units are characterized in that they are equipped with an appropriate communications interface for communication with other units. The communications interface may be, for example, an Ethernet interface, an IP interface, a WLAN interface, a Bluetooth interface, or a Zig-Bee interface.

In the scenario in FIG. 1, an authentication of the computer R1 takes place in relation to the computer R2 making use of an extended X.509 certificate. As well as other information, this certificate contains, in a manner known per se, a public key of the subscriber R1, which, within the framework of the authentication, may be used for the encrypted exchange of a secret and for the generation of a session key for a cryptographically secured communication between computers R1 and R2. The certificate is in this situation signed by a trustworthy certification unit. For the verification of the certificate, it is transferred to the computer R2, which then verifies the signature in a manner known per se, based on a root-certificate of the identification unit issuing the certificate or a certificate chain to the root-certificate.

In Table 1 below, the essential information of a conventional X.509 certificate is reproduced. This certificate is used, for example, with the known SSL/TLS authentication or an IKE/IPsec authentication.

TABLE 1

| Certificate |
| --- |
| certificateID: SerialNumber |
| issuedTo: Name |
| issuer: Name |
| validFrom: Time |
| validTo: Time |
| Public Key |
| Attributes |
| Attribute A |
| Attribute B |
| Signature |

In the table above, the expression "certificateID" designates an identity of the certificate, which is specified by the serial number, "SerialNumber". The expression "issuedTo" indicates the subscriber for whom the certificate has been issued, wherein the expression "issuedTo" is followed by the name of the subscriber. The expression "issuer" designates the issuer of the certificate, who is specified by a suitable name of the issuer. The expressions "validFrom" and "validTo" specify the period of validity of the certificate, wherein the expression "validFrom" specifies a point in time, "Time", at which the validity of the certificate commences or has commenced, and the expression "validTo" in turn specifies a point in time, "Time", which determines the expiry date of the certificate. Next, the "Public Key" of the subscriber is contained in the certificate. In addition, several attributes may be present in the certificate, which are defined in the "Attributes" section of the certificate. By way of example, in this situation one attribute is designated as AttributeA and one attribute as AttributeB. Such attributes may, for example, specify entitlements by means of which it is determined which actions can be performed by the subscriber to whom the certificate belongs. Likewise, attributes may specify restrictions on utilization of the certificate; for example, it may be determined that the certificate is only suitable for the digital signature and for authentication, but may not be used for encrypting. The certificate further contains the signature already described heretofore, which is designated by "Signature" and which allows for the verification of the certificate, based on a root-certificate or, respectively, a certificate chain up to the root certificate.

Within the framework of the authentication, described in greater detail hereinafter, of the computer R1 in respect of the computer R2, in the embodiment described here an extended X.509 certificate is used, the structure of which is reproduced in the following Table 2.

TABLE 2

Certificate
certificateID: SerialNumber
issuedTo: Name
issuer: Name
validFrom: Time
validTo: Time
Public Key
Attributes
Attribute A
Attribute B
requiredClaims: Claim-Classifier
Signature The structure of the certificate in Table 2 corresponds very widely to the certificate in Table 1, and the same constituent parts are therefore not explained once again. By distinction from the certificate in Table 1, the extended X.509 certificate now contains a further attribute, which is designated as "requiredClaims". By means of this, what is referred to as a Claim Classifier is specified, which sets forth one or more of what are referred to as "claims", which must be fulfilled in order for the certificate to be regarded as valid. The "claims" represent in this situation embodiments of requirements in the meaning of claim 1. In the embodiment described here, the syntax of the claims is based on what is referred to as the "Claims-based Authorization Model", which was presented by Microsoft as a part of the Geneva Frameworks 2008 (see also http://msdn.microsoft.com/en-us/magazine/dd278426.aspx). The Claim Classifier may be encoded directly in the certificate, but may also, if appropriate, contain a reference to a Claim Classifier (e.g. a URL or URI) in the certificate, by means of which access can be made to the Claim Classifier.

An example of a syntax according to which a Claim Classifier can be specified by the Claims-based Authorization Model referred to heretofore, reads as follows:

```
<claimTypeRequirements>
    <add claimType=
http://schemas.xmlsoap.org/ws/2005/05/identity/claims/name is
Optional="false"/.
    <add claimType=
"urn:remoteServiceApp/2010/04/claims/permission"
isOptional="false"/>
</claimTypeRequirements>
```

The syntax represented is known per se in the art and will therefore not be explained in detail. The expression "claimType" makes reference to the corresponding claims or their names. The expression "isOptional" specifies whether or not the presence of the corresponding claim is optional. In the claim classifier referred to heretofore, the variable "isOptional" is set to false, i.e. the claims must be fulfilled in order for the certificate to be regarded as valid.

Instead of using the claims described heretofore for the specification of requirements, in a further embodiment of method there is also the possibility of encoding SAML assertions into the certificate. By means of these SAML assertions, which are based on the known XML-based SAML language, a definition is specified. An example of a syntax as to how SAML assertions instead of a Claim Classifier can be coded in a certificate, runs as follows:

```
<samlSecurityTokenRequirement>
<roleClaimType value=
"urn:remoteServcetApp/2010/04/claims/permission"/>
</samlSecurityTokenRequirement>
```

This syntax is known per se, and is therefore not explained in detail. The syntax contains the variable "value", which specifies an SAML assertion which must be fulfilled in order for the certificate to be regarded as valid.

In order to ensure in the communications network in FIG. 1 that a corresponding claim or a corresponding SAML assertion are in fact fulfilled, the computer R3 is used, which represents an issuer for corresponding claims or assertions respectively. Only when this computer has issued one or more of the assertions or claims respectively which are specified in the corresponding certificate is the certificate to be regarded as valid. In FIG. 1, in this situation, the corresponding certificate of the computer R1 is indicated by the reference letter C, and the claims contained in it by the reference letter CL. In one variant, it may additionally be indicated by which issuing computer the corresponding claims or SAML assertions respectively must be issued, in order for the certificate to have validity. This information may, if appropriate, be in turn coded in the certificate in the form of a corresponding claim or a corresponding SAML assertion respectively.

Explained hereinafter on the basis of FIG. 1 is a realization of an authentication based on the extended X.509 certificate referred to heretofore, wherein corresponding requirements in the form of claims CL are specified in the certificate C. In a step S1, the computer R1, which wishes to authenticate itself in relation to the computer R2, first requests the corresponding claims based on the claims classifier in its certificate from the computer R3. When the computer R3 issues a corresponding claim, it is thereby also issuing assurance that the corresponding requirement in accordance with the claim is fulfilled. Based on the claims requested in step S1, the computer R3 determines which of the claims it has in fact issued. In step S2 the computer then transfers this information to the computer R1. In the embodiment described here, the claims themselves are transferred to the computer R1.

Next, the actual certificate-based authentication finally takes place, which is designated as step S3. In this situation, the certificate C of the computer R1, and all or a part quantity of the claims transferred in step S2 are transferred to the computer R2. The computer R2 then verifies the certificate in a manner known per se, and further checks whether it is classifying the certificate as valid. This is the case in particular if the claims specified in the certificate concur with the other transferred claims. If the certificate C is not classified as valid, the authentication is interrupted. The authentication may in this situation be based on the protocols known per se, such as, for example, SSL/TLS or IKE/IPsec or IKEv2/IPsec respectively, wherein, within the framework of these protocols, the presence of the claims is now additionally checked. If the authentication described above in accordance with step S3 has been concluded, it is then possible, by means of a corresponding public key, for a session key to be negotiated in the certificate, and a cryptographically secured communication to take place between the computers R1 and R2. This is designated in FIG. 1 by the step S4.

In a variant of the embodiment from FIG. 1 there is also the possibility of the checking of the claims CL specified in the certificate C being performed directly by the computer R2, i.e. the computer R2 itself requests the claims from the issuing computer R3. In this case, the claims no longer need to be transferred from the computer R1 to the computer R2. In a further embodiment there is also the possibility, within the framework of the authentication, of a certificate from the computer R2, with corresponding claims contained in it, being transferred to the computer R1 and being checked there. This means that it is also possible for a mutual authentication to take place both by the computer R1 in relation to the computer R2 as well as by the computer R2 in relation to the computer R1. In order to avoid misuse within the framework of the determination of the validity of the certificate by means of corresponding claim, it is possible, within the framework of the requesting of the claims by the computer R1 or R2 respectively from the computer R3, for an authentication also to be given priority, i.e. only if the computers R1 or R2 respectively can authenticate themselves to the computer R3 will they have access to the issued claims.

Within the framework of FIG. 2, once again in diagrammatic form, an exchange of information is shown between the computers R2 and R1 for mutual certificate-based authentication between the computers. This exchange of information takes place in this situation by means of the SSL/TLS protocol known per se. The subsequent steps S101 to S104 comprise in this situation, as a rule, in each case a plurality of part steps, which are known per se from the SSL/TLS protocol, and are therefore not described in any greater detail. Within the framework of the step S101, the computer R2 requests from the computer R1 its certificate C, with the claims CL contained in it. In step S102, this certificate is transferred, wherein, in step S103, the checking of the certificate takes place. Within the framework of this step, a check is also performed to determine whether the claims contained in the certificate C were in fact also issued by the computer R3. In step S104, the computer R2 also sends its certificate C' with claims CL' contained in it, to the computer R1. After reception of the certificate in the computer R1, in step S105, by analogy to step S103, a check of the certificate C' is performed in depth in order to determine whether the claims CL' have in fact also been issued by the computer R3. If the checks in steps S103 and S105 are both positive, both certificates are regarded by the corresponding computers as valid, and a corresponding authentication can take place, within the framework of which a session key SK is inserted between the two computers R1 and R2. With the aid of this key, a confidentiality-protected communication can then take place.

Figure 2:
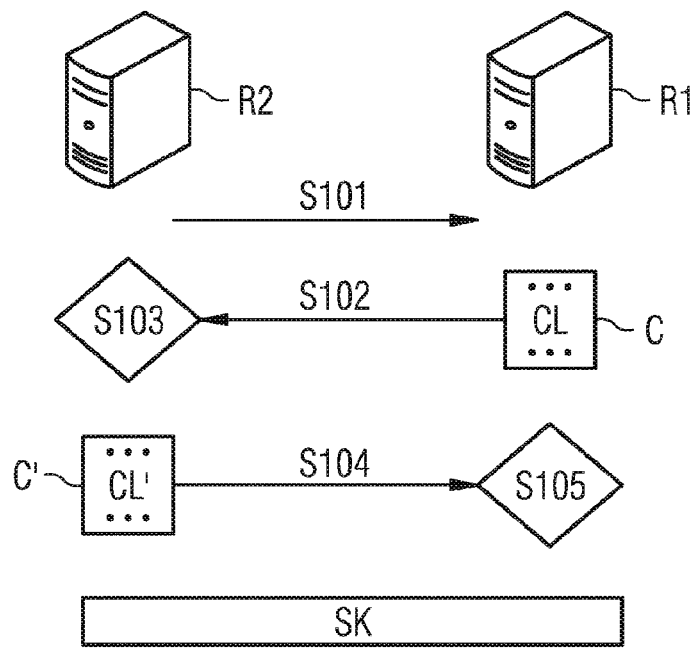
FIG. 2 shows a diagrammatic representation of an exchange of messages between two subscribers in a communications network, who are carrying out mutual authentication based on an example embodiment of the method.

In the variant of FIG. 2, the corresponding requirements of the certificate are checked within the framework of the protocol sequence. This check may, however, alternatively also be performed separately, outside the protocol, between the authenticating communications partners, for example, by means of the HTTP protocol, after an SSL/TLS connection set up has been concluded, via the established SSL/TLS connection.

As can be determined from the foregoing description, the validity of a certificate in the embodiments described is determined by way of corresponding requirements specified in the certificates, wherein the check as to whether a requirement has been fulfilled takes place with the assistance of a subscriber, who issues these requirements and therefore assures that a corresponding requirement has been fulfilled. For the realization of such a validity restriction it is possible, in this situation, to make use of mechanisms known in the art, based on corresponding claims of the claims-based authorization model referred to heretofore or, respectively, based on SAML assertions. The certificate is therefore not valid on its own, but only together with correspondingly issued requirements. By the issue, or revocation of the issue, of the corresponding requirements by way of the subscriber who is issuing the requirements, it is possible in this situation for the validity of a digital certificate to be granted or revoked respectively in a flexible manner.

The requirements may in this situation be linked to any desired criteria. For example, a certificate may be issued for a subscriber which is only valid for as long as this subscriber is being operated in the current communications environment, wherein the communications environment is specified, for example, by a corresponding network address. The requirements may also be issued as a function of the subscriber who wishes to authenticate himself, or, as appropriate, also by the subscriber in respect of whom the authentication is being performed. The requirement may in this situation be determined in such a way that a subscriber can authenticate himself, for example in respect of one subscriber, while by contrast authentication in respect of another subscriber is not possible. In a further embodiment, it is possible, by means of a requirement, for a confidence value to be specified which will determine the trustworthiness of the authentication performed. In this situation account is taken of the fact that the quality of an authentication may change in the course of the service life of a subscriber, for example if attacks become known, or if a specific subscriber has been hacked, or if there is the possibility that a subscriber could have been manipulated, e.g. by a previous owner who was not trustworthy.

In a further embodiment, the requirements specified in the certificate may also be concatenated in a suitable manner. This makes it possible for the circle of subscribers to be restricted who, for example, are permitted to make recourse to a specific resource present in the network. A requirement associated with a subscriber certificate may in this situation require a further requirement from the subscriber, which describes how this subscriber has authenticated himself. The corresponding requirements may be issued, for example, by the device manufacturer of the corresponding subscriber. This device manufacturer usually also issues the certificate for the subscriber.

The concatenation described heretofore of the requirements may take place with logic operators AND, NAND, OR, XOR and NOR known per se. The corresponding logic concatenation may in this situation be coded into the certificate. By means of such a concatenation it is possible, for example, for blocking requirements to be issued for corresponding certificates. These blocking requirements can be used to declare certificates of a plurality of subscribers as invalid. If a blocking requirement is linked in this situation with an NAND linking with other requirements, then the absence of the blocking requirement is a necessary criterion for the certificate to be valid.

Certain embodiments of the disclosed method may provide one or more advantages. For example, certificates may be issued for corresponding subscribers with practically infinite validity. This can be performed, for example with an X.509 certificate, by the corresponding specifications "validFrom" and "validTo" being set to an infinitely valid period of time. Nevertheless, in order to revoke the certificate, it is sufficient in this situation for a requirement, which must be present in order for a corresponding certificate to be valid, no longer to be provided by the issuer of the requirements.

There is likewise the possibility that the corresponding requirements for regulating the validity of the certificate in a local communications network, for example in the communications network of an automation system, to be issued by a local subscriber in the system. In particular, the manufacturer of an automation system may issue corresponding certificates for the individual components, with requirements specified in them, wherein, however, the issue of the requirements is regulated locally by the operator of the automation system.

What is claimed is:

1. A method for mutual certificate-based authentication, comprising:
   a first subscriber transmitting to a second subscriber, via a communications network, a digital certificate associated to the first subscriber and which contains a public key of the first subscriber, wherein the digital certificate identifies the presence of one or more requirements and for which the fulfillment thereof is ensured by a third subscriber that issues the one or more requirements, wherein the one or more requirements are issued separately from the digital certificate by the third subscriber,
   checking, by a processor of the second subscriber, a validity condition within a framework of an authentication performed by the second subscriber,
   classifying, by a processor of the second subscriber, the digital certificate of the first subscriber as valid when the validity condition is fulfilled, wherein the validity condition is dependent on whether or not one or more of the requirements specified in the digital certificate have been issued by the third subscriber to either the first subscriber or the second subscriber;
   wherein the first subscriber requests information from the third subscriber as to whether one or more of the requirements identified in the digital certificate were issued by the third subscriber, wherein the first subscriber provides the information requested to the second subscriber, whereupon the second subscriber, based on this information, checks the validity condition, wherein the first and the second subscribers must authenticate themselves to the third subscriber for the requesting of the one or more requirements;
   wherein the validity condition is a logic operations sequence comprising multiple links selected from the group consisting of AND-links, NAND-links, OR-links, XOR-links, and NOR-links, wherein the operations sequence is encoded in the digital certificate; and
   wherein at least one of the first, second, and third subscriber represents components of an automation system.

2. The method of claim 1, wherein the second subscriber requests information from the third subscriber as to whether one or more of the requirements identified in the digital certificate have been issued by the third subscriber, wherein the second subscriber, based on the requested information, checks the validity condition.

3. The method of claim 1, wherein one or more of the following requirements are identified in the digital certificate:
   a requirement with regard to the time validity of the digital certificate;
   a requirement with regard to a communications environment in which the first subscriber is being operated;
   a requirement with regard to one or more properties of at least one of the first subscriber, the second subscriber, and the third subscriber; and
   a requirement with regard to the trustworthiness of the authentication of the first subscriber to the second subscriber.

4. The method of claim 1, wherein the one or more requirements are based on SAML.

5. The method of claim 1, wherein, within the framework of the authentication of the first subscriber with respect to the second subscriber a verification is performed of the digital certificate of the first subscriber by the second subscriber.

6. The method of claim 1, wherein, with a public key of the first subscriber contained in the digital certificate as well as a private key allocated to this public key, a cryptographically secure connection is set up between the first and second subscribers.

7. The method of claim 1, wherein the authentication is based on at least one protocol selected from the group consisting of the SSL/TLS protocol, the IKE/IPsec protocol, and the IKEv2/IPsec protocol.

8. The method of claim 1, wherein the digital certificate is an extended X.509 certificate, which additionally specifies one or more requirements.

9. The method of claim 1, wherein the method for the authentication of the first subscriber to the second subscriber and of the second subscriber to the first subscriber is used.

10. A communications network comprising:
    a first subscriber device, a second subscriber device, and a third subscriber device communicatively coupled to each other via a communications network,
    wherein the first and second subscriber device are configured to perform a certificate-based authentication prior to initiating a confidentially-protected communication between the first and second subscriber device, wherein, in the operation of the communications network, the first subscriber device authenticates himself to the second subscriber device with the aid of a digital certificate associated to the first subscriber device and containing a public key of the first subscriber device, wherein the digital certificate identifies one or more requirements for which the fulfillment thereof is ensured by the third subscriber device, and wherein upon request the third subscriber device is configured to issue the one or more requirements identified by the digital certificate associated with the first subscriber device, wherein the one or more requirements are issued separately from the digital certificate by the third subscriber, wherein, within a framework of an authentication process by the second subscriber device:
the second subscriber device is configured to classify the digital certificate of the first subscriber device as valid when a validity condition is fulfilled, wherein the validity condition is dependent on whether or not one or more of the requirements specified in the digital certificate have been issued by the third subscriber device;

wherein the first subscriber requests information from the third subscriber as to whether one or more of the requirements identified in the digital certificate were issued by the third subscriber, wherein the first subscriber provides the information requested to the second subscriber, whereupon the second subscriber, based on this information, checks the validity condition, wherein the first and the second subscribers must authenticate themselves to the third subscriber for the requesting of the one or more requirements;

wherein the validity condition is a logic operations sequence comprising multiple links selected from the group consisting of AND-links, NAND-links, OR-links, XOR-links, and NOR-links, wherein the operations sequence is encoded in the digital certificate; and wherein at least one of the first, second, and third subscriber represents components of an automation system.

11. A method for mutual certificate-based authentication, comprising:
transmitting, from a first subscriber to a second subscriber, via a communications network, a first digital certificate associated to the first subscriber and which contains a public key of the first subscriber, wherein the first digital certificate specifies one or more first requirements and for which the fulfillment thereof is ensured by a third subscriber, classifying, by a processor of the second subscriber, the first digital certificate of the first subscriber as valid when a first validity condition is fulfilled, wherein the first validity condition is dependent on whether or not the one or more first requirements specified in the first digital certificate have been separately issued by the third subscriber, the second subscriber transmitting to the first subscriber, via the communications network, a digital certificate associated to the second subscriber and which contains a public key of the second subscriber, wherein the second digital certificate specifies one or more second requirements for which the fulfillment thereof is ensured by the third subscriber, classifying, by a processor of the first subscriber, the second digital certificate of the second subscriber as valid when a second validity condition is fulfilled, wherein the second validity condition is dependent on whether or not the one or more second requirements specified in the second digital certificate have been separately issued by the third subscriber, initiating, by the respective processors of the first and second subscribers, a confidentially-protected communication between the first and second subscribers only when both (a) the second subscriber classifies the first digital certificate of the first subscriber as valid and (b) the first subscriber classifies the second digital certificate of the second subscriber as valid;

wherein the first subscriber requests information from the third subscriber as to whether one or more of the requirements identified in the digital certificate were issued by the third subscriber, wherein the first subscriber provides the information requested to the second subscriber, whereupon the second subscriber, based on this information, checks the validity condition, wherein the first and the second subscribers must authenticate themselves to the third subscriber for the requesting of the one or more requirements;

wherein the validity condition is a logic operations sequence comprising multiple links selected from the group consisting of AND-links, NAND-links, OR-links, XOR-links, and NOR-links, wherein the operations sequence is encoded in the digital certificate; and wherein at least one of the first, second, and third subscriber represents components of an automation system.

* * * * *